United States Patent
Yamamoto

(10) Patent No.: US 10,632,795 B2
(45) Date of Patent: Apr. 28, 2020

(54) PNEUMATIC TIRE

(71) Applicant: Sumitomo Rubber Industries, Ltd., Kobe-shi, Hyogo (JP)

(72) Inventor: Tetsuya Yamamoto, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 1248 days.

(21) Appl. No.: 14/674,948

(22) Filed: Mar. 31, 2015

(65) Prior Publication Data
US 2015/0290977 A1    Oct. 15, 2015

(30) Foreign Application Priority Data

Apr. 14, 2014 (JP) ................. 2014-083023

(51) Int. Cl.
| | | |
|---|---|---|
| *B60C 11/03* | (2006.01) | |
| *B60C 11/12* | (2006.01) | |
| *B60C 11/11* | (2006.01) | |
| *B60C 11/13* | (2006.01) | |

(52) U.S. Cl.
CPC .............. *B60C 11/12* (2013.01); *B60C 11/11* (2013.01); *B60C 11/1376* (2013.01); *B60C 11/1392* (2013.01); *B60C 2011/1209* (2013.01); *B60C 2200/14* (2013.01)

(58) Field of Classification Search
CPC .......... B60C 11/1367; B60C 11/1392; B60C 11/0306; B60C 11/0309; B60C 11/11; B60C 11/0311; B60C 11/12; B60C 2011/1209; B60C 2200/14; B60C 5/00
See application file for complete search history.

(56) References Cited

U.S. PATENT DOCUMENTS

| | | | |
|---|---|---|---|
| 6,065,517 A | | 5/2000 | Maruyama |
| D627,709 S | * | 11/2010 | Harvey .................. D12/579 |
| 2005/0103416 A1 | * | 5/2005 | Rooney ............... B60C 11/0316 152/209.16 |

(Continued)

FOREIGN PATENT DOCUMENTS

| | | | | |
|---|---|---|---|---|
| AU | 2011309648 A1 | * | 5/2013 | ......... B60C 11/0302 |
| DE | 1213276 B | * | 3/1966 | ............. B29D 30/08 |

(Continued)

OTHER PUBLICATIONS

Search Report dated Aug. 14, 2015 for European Application No. 15162748.6.

*Primary Examiner* — Steven D Maki
*Assistant Examiner* — Philip N Schwartz
(74) *Attorney, Agent, or Firm* — Birch, Stewart, Kolasch & Birch, LLP

(57) ABSTRACT

A pneumatic tire includes a tread portion having a pair of central block rows arranged on both sides of a tire equator. Each of the central block rows includes a plurality of central blocks arranged in a circumferential direction of the tire. Each of the central blocks includes a ground contacting face with an axially inner block edge facing the tire equator. The inner block edge includes a first inclined edge and a second inclined edge inclined in an opposite direction to the first inclined edge so that the inner block edge protrudes toward the tire equator. The first inclined edge includes a first circular arc portion with a center located on the side of the tire equator.

19 Claims, 5 Drawing Sheets

(56) References Cited

U.S. PATENT DOCUMENTS

| | | | |
|---|---|---|---|
| 2008/0047642 A1 | 2/2008 | Ohara et al. | |
| 2008/0073012 A1* | 3/2008 | Miyazaki | B60C 11/0311 |
| | | | 152/209.19 |
| 2008/0110541 A1* | 5/2008 | Sueishi | B60C 11/11 |
| | | | 152/209.15 |
| 2009/0107600 A1* | 4/2009 | Missik-Gaffney | |
| | | | B60C 11/0311 |
| | | | 152/209.16 |

FOREIGN PATENT DOCUMENTS

| | | | | |
|---|---|---|---|---|
| JP | 02095903 A | * | 4/1990 | B60C 11/11 |
| JP | 2008-49751 A | | 3/2008 | |
| WO | WO 02/068222 A1 | | 9/2002 | |
| WO | WO 2012043036 | * | 4/2012 | B60C 11/0302 |

* cited by examiner

PNEUMATIC TIRE

BACKGROUND OF THE INVENTION

Field of the Invention

The present invention relates to a pneumatic tire, and more particularly to a pneumatic tire for off-road having excellent mud terrain performance.

Description of the Related Art

Pneumatic tires for off-road have been requested to obtain excellent mud terrain performance that offers a large traction on mud terrain as well as self-cleaning ability to remove mud from grooves during traveling. In order to improve the mud terrain performance of tires, a tread portion provided with a plurality of tread blocks has been proposed (See Japanese Unexamined Patent application Publication No. JP2008-49751A1). Each of the tread blocks has a ground contacting face having a block edge including an axial component. The axial component of the block edge may generate traction by shearing a lump of mud on the ground.

Recent years, consumers have been requesting pneumatic tires having further improved mud terrain performance.

SUMMARY OF THE INVENTION

Problems to be Solved by the Invention

The present invention has been worked in light of the circumstances described above, and it is a main object thereof to provide a pneumatic tire having improved mud terrain performance.

Means of Solving the Problems

In accordance with the present invention, there is provided a pneumatic tire including a tread portion having a pair of central block rows arranged on both sides of a tire equator, each of the central block rows including a plurality of central blocks arranged in a circumferential direction of the tire, each of the central blocks including a ground contacting face having an axially inner block edge facing the tire equator, the inner block edge including a first inclined edge and a second inclined edge inclined in an opposite direction to the first inclined edge so that the inner block edge protrudes toward the tire equator, and the first inclined edge including a first circular arc portion having a center located on the side of the tire equator.

In another aspect of the invention, a radius of curvature of the first circular arc portion may be in a range of from 30 to 60 mm.

In another aspect of the invention, the first inclined edge may have a circumferential length longer than that of the second inclined edge.

In another aspect of the invention, the first inclined edge may further include a second circular arc portion having a center located on a side of a tread edge.

In another aspect of the invention, the second circular arc portion may be arranged on a side of the second inclined edge of the first circular arc portion.

In another aspect of the invention, each of the central blocks may include an outer block sidewall facing a tread edge, the outer block sidewall may include a first inclined wall and a second inclined wall inclined to cross the first inclined wall so that the outer block sidewall is dented toward the tire equator, and the ground contacting face may be provided with a recess on a portion where the first inclined wall crosses the second inclined wall.

In another aspect of the invention, the recess may have a depth in a range of from 50% to 80% of a height of the central block.

In another aspect of the invention, the recess may have a substantially triangle shape having one corner protruding toward the tire equator, in a plan view of the central block.

In another aspect of the invention, each of the central blocks provided on one side of the tire equator may be arranged with respect to each of the central blocks provided on the other side of the tire equator so as to have an overlap length in the circumferential direction of the tire in a range of from 50% to 92% a circumferential maximum length of the central block.

In another aspect of the invention, each of the central blocks may be provided with at least one sipe having a circumferential component length and an axial component length, and the circumferential component length may be in a range of not less than 45% the total of the circumferential and axial component lengths of the sipe.

DESCRIPTION OF THE EMBODIMENTS

Figure 1:
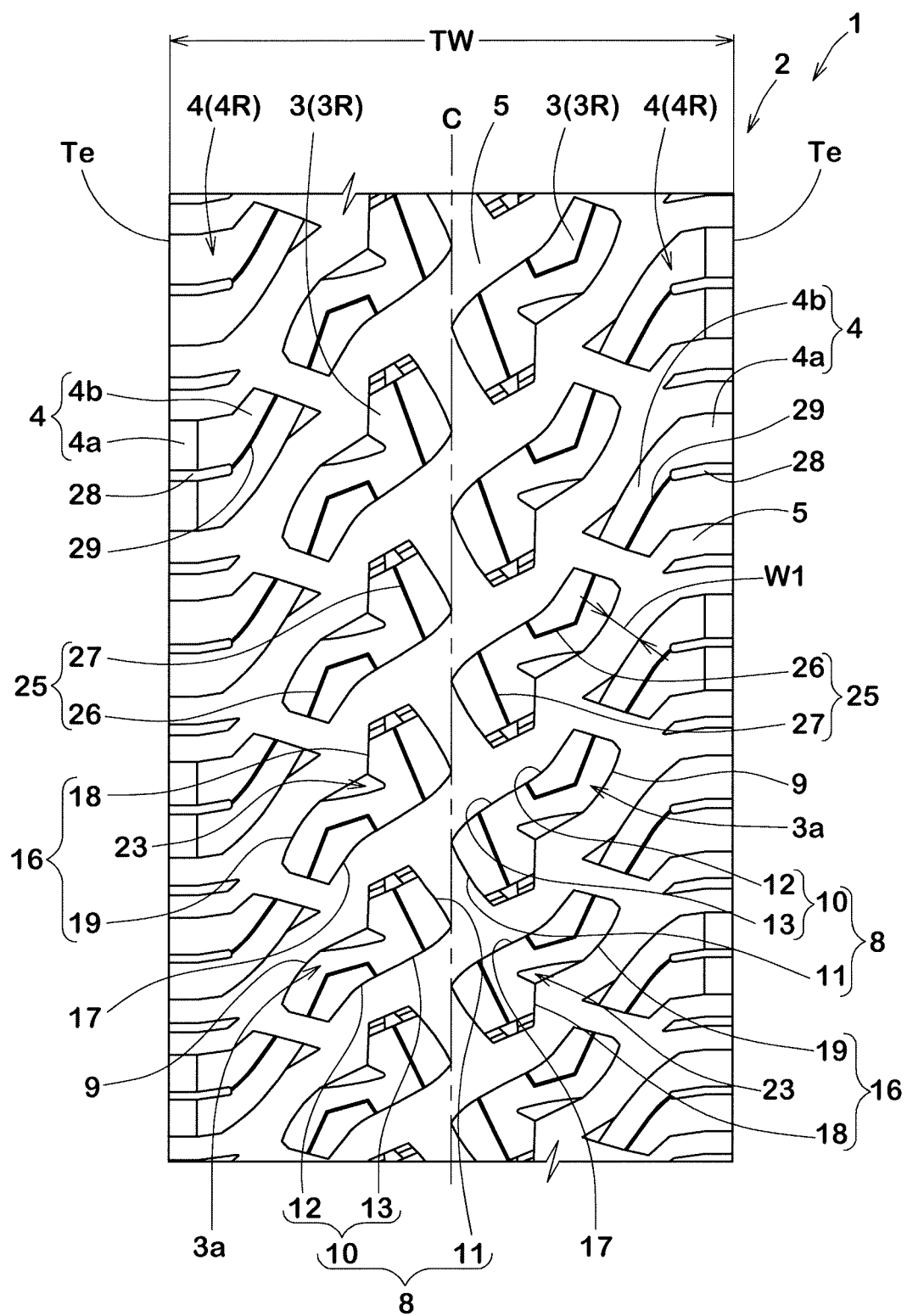
FIG. 1 is a development view of a tread portion of a pneumatic tire in accordance with an embodiment of the present invention.

An embodiment of the present invention will be explained below with reference to the accompanying drawings. FIG. 1 illustrates a development view of a tread portion 2 of a pneumatic tire 1 in accordance with an embodiment of the present invention. As shown in FIG. 1, the pneumatic tire 1 in accordance with the present embodiment, for example, is preferably embodied as an all season tire for four-wheel drive vehicle.

The tread portion 2 is provided with a pair of central block rows 3R arranged on both sides of the tire equator C, and a pair of shoulder block rows 4R each arranged proximately to each tread edge Te on both sides of the tire equator C. Each of the central block rows 3R includes a plurality of central blocks 3 arranged in a circumferential direction of the tire. Each of the shoulder block rows 4R includes a plurality of shoulder blocks 4 arranged in the circumferential direction of the tire. The tread portion 2 further includes a groove 5 to define the respective central blocks 3 and shoulder blocks 4.

The tread edges Te refer to axially outermost edges of the ground contacting patch of the tread portion 2 which occurs under a normally inflated loaded condition when the camber angle of the tire is zero. The normally inflated loaded condition is such that the tire 1 is mounted on a standard wheel rim with a standard pressure and loaded with a standard tire load.

The standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

The standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

The standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

In case of passenger car tires, however, the standard pressure and standard tire load are uniformly defined by 180 kPa and 88% of the maximum tire load, respectively.

In this application including specification and claims, various dimensions, positions and the like of the tire refer to those under a normally inflated unloaded condition of the tire unless otherwise noted. The normally inflated unloaded condition is such that the tire 1 is mounted on the standard wheel rim with the standard pressure but loaded with no tire load. The tread width TW is the width measured under the normally inflated unloaded condition, as the axial distance between the tread edges Te and Te.

Preferably, the groove 5 has a width W1, which is measured perpendicular to its groove centerline, in a range of from 5% to 15% of the tread width TW, in order to offer sufficient void to improve traction force on mud terrain as well as self-cleaning ability of the tread portion while offering sufficient rigidity of the respective blocks 3 and 4.

Each of the central blocks 3 includes a ground contacting face 3a that includes an inner block edge 8 facing the tire equator C, and an outer block edge 9 facing the tread edge Te.

The inner block edge 8 includes a first inclined edge 10 and a second inclined edge 11 inclined in an opposite direction to the first inclined edge 10 so that the inner block edge 8 protrudes toward the tire equator C. The inner block edge 8 includes an axial component that may generate traction force during traveling on mud terrain by shearing mud. Furthermore, the inner block edge 8 also includes a circumferential component that may help to smoothly expel mud in the groove 5 backwardly along the inner block edge 8 during traveling. Thus the self-cleaning ability of the tread portion 2 may be ensured.

Figure 2:
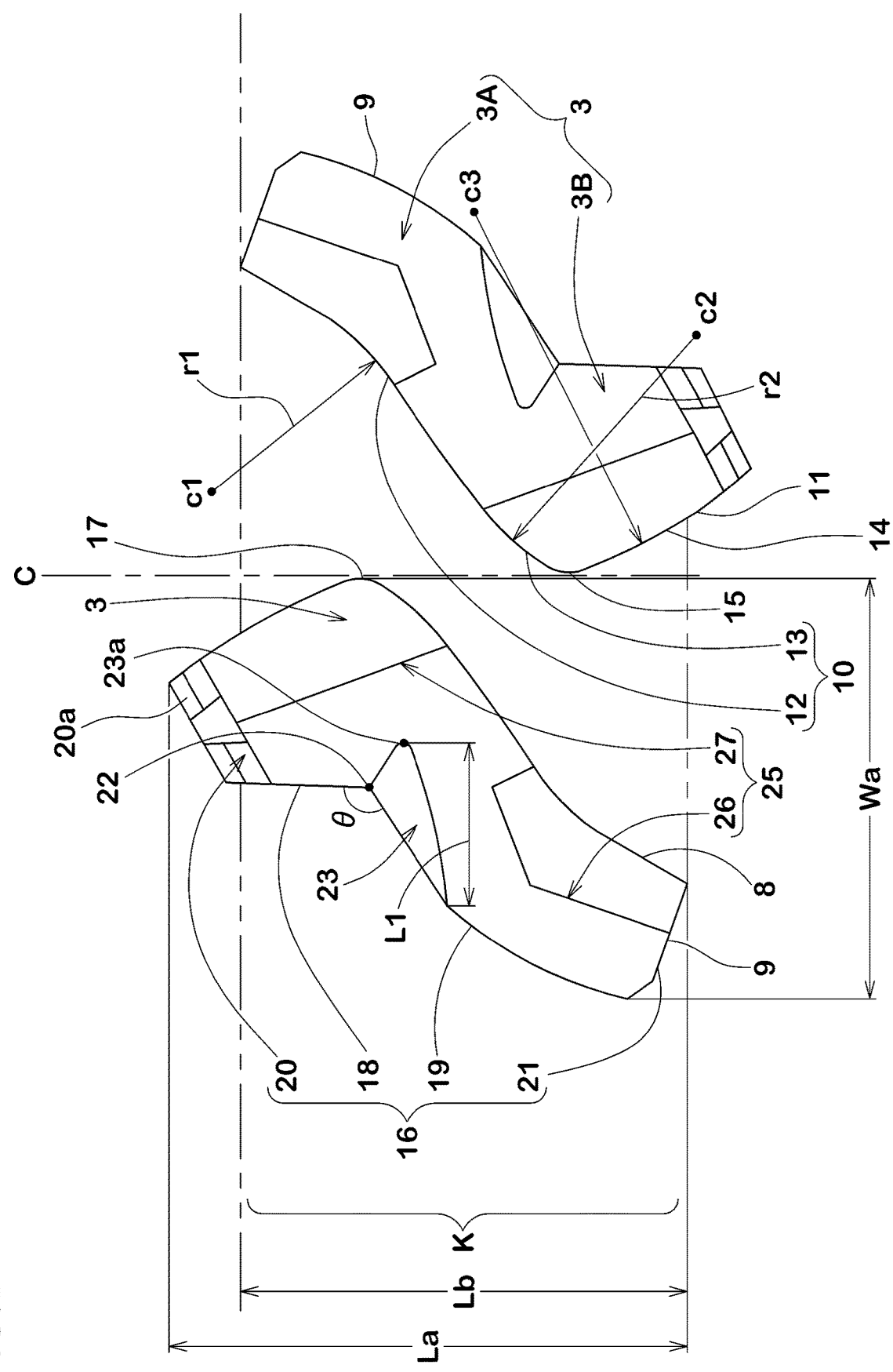
FIG. 2 is an enlarged view of central blocks of FIG. 1.

As shown in FIG. 2, the first inclined edge 10 in accordance with the present embodiment includes a first circular arc portion 12 having a center c1 located on the side of the tire equator C and a second circular arc portion 13 having a center c2 located on the side of the tread edge Te. Thus the first circular arc portion 12 may introduce a lot of mud into the groove 5 when coming into contact with mud terrain, thereby generating a large traction force. Furthermore, the second circular arc portion 13 may smoothly dispel the mud backwardly from the groove 5 during traveling. The second circular arc portion 13 may enhance rigidity of the central block 3 so that a shearing force against mud is improved.

Preferably, the first circular arc portion 12 has a radius of curvature r1 in a range of from 30 to 60 mm. When the radius of curvature r1 of the first circular arc portion 12 is less than 30 mm, mud introduced in the groove 5 of the tread portion 2 may not be released from the groove 5 smoothly. When the radius of curvature r1 of the first circular arc portion 12 is more than 60 mm, the first circular arc portion 12 may not introduce mud into the groove 5 efficiently.

In this embodiment, the second circular arc portion 13 is arranged on the side of the second inclined edge 11 of the first circular arc portion 12. Namely, the second circular arc portion 13 is arranged on the side of the tire equator C of the first circular arc portion 12. Thus the rigidity of an axially inner portion of the central blocks 3 may be enhanced so that a larger traction force is generated during straight traveling on mud terrain.

In this embodiment, the second circular arc portion 13 is configured as a smooth curve including a plurality of connected arcs having different radii. However, it is not particularly limited to the embodiment above. Preferably, the second circular arc portion 13 has a radius of curvature r2 in a range of from 30 to 80 mm.

Preferably, the first inclined edge 10 has a circumferential length larger than that of the second inclined edge 11. This configuration may help to generate a large traction force on mud terrain.

In this embodiment, the first inclined edge 10 is configured so that the first circular arc portion 12 and the second circular arc portion 13 are smoothly connected one another, thereby further improving the self-cleaning ability of the tread portion 2.

In this embodiment, the second inclined edge 11 includes a third circular arc portion 14 having a center c3 located on the side of the tread edge Te. Thus the second inclined edge 11 may further enhance the rigidity of the axially inner portion of the central blocks 3, thereby increasing traction force. In this embodiment, the whole of the second inclined edge 11 is configured using the third circular arc portion 14 in order to further improve the advantageous effect described above.

The corner 15 connecting between the second inclined edge 11 and the first inclined edge 10 is formed in an arc manner. This configuration may further enhance the rigidity of the axially inner portion of the central blocks 3.

The central block 3 includes an outer block sidewall 16 extending radially inward from the outer block edge 9 so as to faces the tread edge Te, and an inner block sidewall 17 faces extending radially inward from the inner block edge 8 so as to face the tire equator C.

In this embodiment, the outer block sidewall 16 includes a first inclined wall 18, a second inclined wall 19 inclined so as to cross the first inclined wall 18, a third inclined wall 20 inclined in the same direction to the second inclined wall 19, and a fourth inclined block wall 21 inclined in an opposite direction to the second inclined wall 19, in a plan view of the central block 3.

The outer block sidewall 16 is dented toward the tire equator C due to a crossing between the first inclined wall 18 and the second inclined wall 19. When the outer block sidewall 16 comes into contact with mud terrain, both of the inclined walls 18 and 19 may elastically deform to approach one another around the crossing portion 22 so as to compress the mud therebetween, thereby offering a large traction force. On the other hand, when the central block 3 is released from the ground due to the tire rotation, the both of the inclined walls 18 and 19 would return to a state before deformation to separate one another. Thus mud held and compressed between the walls 18 and 19 may be released therefrom, thereby offering excellent self-cleaning ability of the tread portion 2. Accordingly, the outer block sidewall 16 may further improve the traction force on mud terrain due to the first inclined wall 18 and the second inclined wall 19.

In the plan view of the central block 3, an angle θ between the first inclined wall 18 and the second inclined wall 19 is preferably in a range of from 100 to 150 degrees, more preferably in a range of from 110 to 140 degrees. When the angle θ is excessively large, the deformation of the first inclined wall 18 and the second inclined wall 19 may be reduced. When the angle θ is excessively small, it may be difficult to remove the mud from between the first inclined wall 18 and the second inclined wall 19.

The ground contacting face 3a is provided with a recess 23 on the crossing portion 22 between the first inclined wall 18 and the second inclined wall 19. Such a recess 23 may be useful to grab mud during traveling to help increasing traction force. Furthermore, the recess 23 may reduce the rigidity around the crossing portion 22 of the central block 3 so that the deformation of the first inclined wall 18 and the second inclined wall 19 during traveling is promoted.

In this embodiment, the recess 23 is arranged in a circumferentially middle area of the central block 3. This design may further promote the deformation of the first inclined wall 18 and the second inclined wall 19 during grounding thereby further improving the mud terrain performance of the tire.

Preferably, the recess 23 has a substantially triangle shape having one corner protruding toward the tire equator C in a plan view of the central block 3. Such a recess 23 having a triangle shape may further reduce the rigidity around it of the central block 3. Accordingly, the deformation of the first inclined wall 18 and the second inclined wall 19 during traveling described above may further be promoted, thereby further improving the mud terrain performance of the tire.

Figure 3:
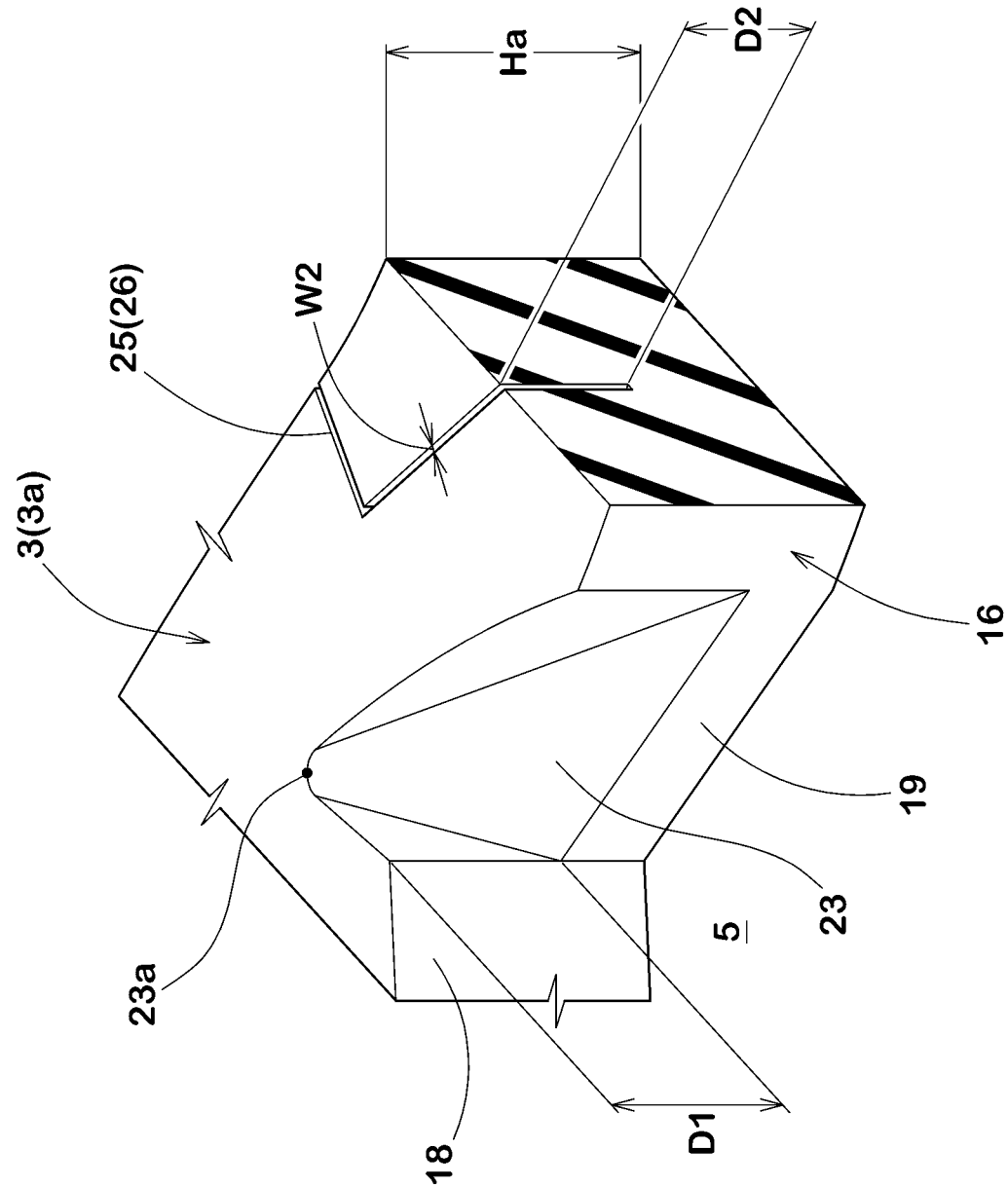
FIG. 3 is an enlarged perspective view of around a recess provided on the central block.

As shown in FIG. 3, the recess 23 in accordance with the present embodiment has a depth D1 gradually decreasing toward its axially inner end 23a to improve the self-cleaning ability of the tread portion 2. In another aspect, the recess 23 may have the substantially constant depth (not shown).

The depth (maximum depth) D1 of the recess 23 is preferably in a range of from 50% to 80% of the height Ha of the central block 3 in order to ensure the rigidity of the central block 3 while improving traction force on mud terrain.

As shown in FIG. 2, the recess 23 has an axial length L1 in a range of from 10% to 30% of the axial width Wa of the central block 3 in order to further improve the advantageous effects described above.

In the same point of view, the recess 23 preferably has an area in a range of from 3% to 10% of the gross area of the ground contacting face 3a of the central block 3 in a plan view of the central block 3. Here, the gross area of the ground contacting face 3a of the central block 3 refers to an area that includes the area of the recess 23.

The third inclined wall 20 includes a steplike portion 20a that includes a depth varying in a steplike manner in the radial direction of the tire. The steplike portion 20a may further increase traction force on mud terrain due to the edge component thereof.

In this embodiment, the central block 3 includes a first inclined portion 3A and a second inclined portion 3B inclined in an opposite direction to the first inclined portion 3A, wherein the first and second inclined portions 3A and 3B are connected each other so as to form a claw shape.

As shown in FIG. 2, the pair of central blocks 3 which are adjacent in the axial direction of the tire are arranged in a point symmetry around a center on the tire equator C. Thus, the second circular arc portions 13 and 13 of the central blocks face one another and are inclined in the same direction so that a groove crossing the tire equator C is provided therebetween. This groove may effectively grab the mud to generate a large traction force.

In this embodiment, each of the central blocks 3 provided on one side of the tire equator C is arranged with respect to each of the central blocks 3 provided on the other side of the tire equator C so as to have an overlap region K. The length Lb of the overlap region K in the circumferential direction of the tire is preferably in a range of from 50% to 92% of the maximum circumferential length La of the central block 3 in order to improve traction force on mud terrain while ensuring self-cleaning ability of the tread portion 2.

Each of the central blocks 3 is provided with at least one sipe 25. The at least one sipe 25 may be useful to soften the central block 3 so that the deformation of the first inclined wall 18 and the second inclined wall 19 during grounding is promoted, thereby further improving the mud terrain performance of the tire.

In this embodiment, the at least one sipe 25 includes two sipes that includes an outer sipe 26 arranged axially outwardly of the central block 3, and an axially inner sipe 27 arranged axially inwardly of the central block 3 which are not communicated one another. Each of the sipes 26 and 27 is an open ended sipe that opens at both of the inner block edge 8 and the outer block edge 9. These sipes 26 and 27 may soften the central block 3 in a well balanced manner to promote the deformation of the first inclined wall 18 and the second inclined wall 19. Furthermore, the outer sipe 26 and the inner sipe 27 are arranged separately in the circumferential direction of the tire, for example.

Figure 4:
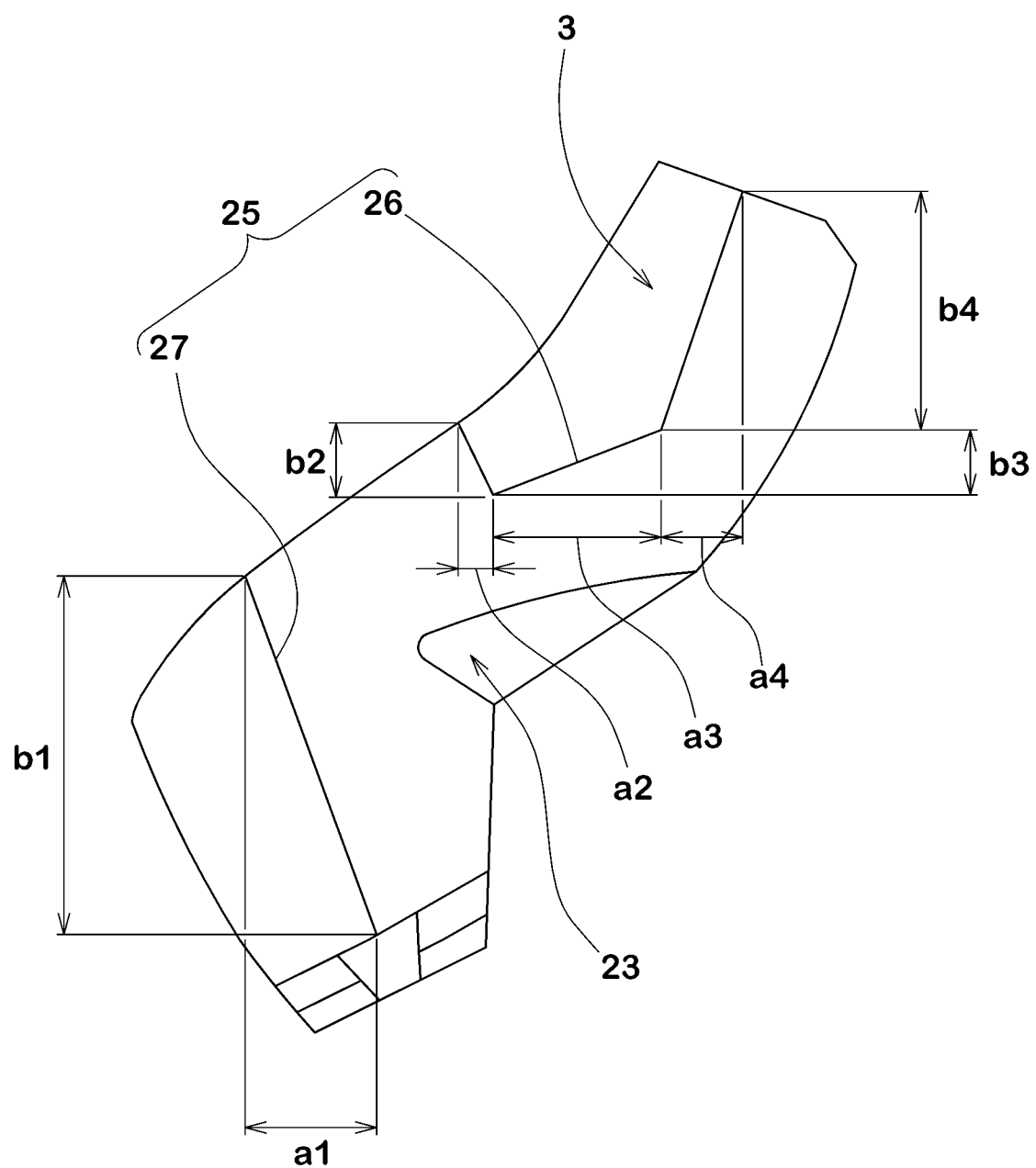
FIG. 4 is an enlarged plan view of one of the central blocks of FIG. 1.

AS shown in FIG. 4, in each of the central blocks 3, each of the sipe 26 and 27 includes a circumferential component length and an axial component length. For example, the inner sipe 27 has the circumferential component length b1 and the axial component length a1. Similarly, the outer sipe 26 has the circumferential component length b2, b3 and b4 and the axial component length a2, a3 and a4. Preferably, the total circumferential component length B (=b1+b2+b3+b4) of the sipes 26 and 27 is preferably in a range of from 45% to 75% of the total of the circumferential and axial component lengths B+A (=b1+b2+b3+b4+a1+a2+a3+a4), in order to further promote the deformation of the first inclined wall 18 and the second inclined wall 19 during traveling while ensuring rigidity of the central block 3.

As shown in FIG. 3, the respective sipe 26 and 27 preferably have depths D2 in a range of from 30% to 70% of the height Ha of the central block 3 and widths W2 of from 0.1 to 0.3 mm.

As shown in FIG. 1, at least one of the shoulder blocks 4 includes an outer portion 4a extending along the axial direction of the tire from the tread edge Te and an inner portion 4b inclined in an angle with respect to the outer portion 4a. Furthermore, the shoulder block 4 is provided with a lug groove 28 extending from the tread edge Te to its axially inner end and a shoulder sipe 29 extending from the inner end of the lug groove 28 along the inner portion 4b.

While the particularly preferable embodiments of the pneumatic tire in accordance with the present invention have been described in detail, the present invention is not limited to the illustrated embodiments, but can be modified and carried out in various aspects.

Example

Pneumatic tires for four-wheel drive vehicles having a basic tread pattern shown in FIG. 1 were manufactured based on the specifications of Table 1, and then mud terrain performance of each tires was tested. Major common specifications of tires and test procedures are as follows.
Tread width TW: 240 mm
Height of central blocks: 17.1 mm
Height of shoulder blocks: 17.1 mm
Mud Terrain Performance Test:

Each test tire was installed to all wheels of a four-wheel drive vehicle having the displacement of 3,600 cc under the following conditions.
Tire size: 37×12.50R17
Rim: 9.0JJ
Inner pressure: 100 kPa Then a test driver drove the vehicle on a test course in mud terrain and evaluated the traction and self-cleaning ability of the tread by his feeling. The results were indicated using a score, wherein the Ref. 1 is scored 100. The larger the score, the better the performance is.

The test results are shown in Table 1.

TABLE 1

Figure 5:
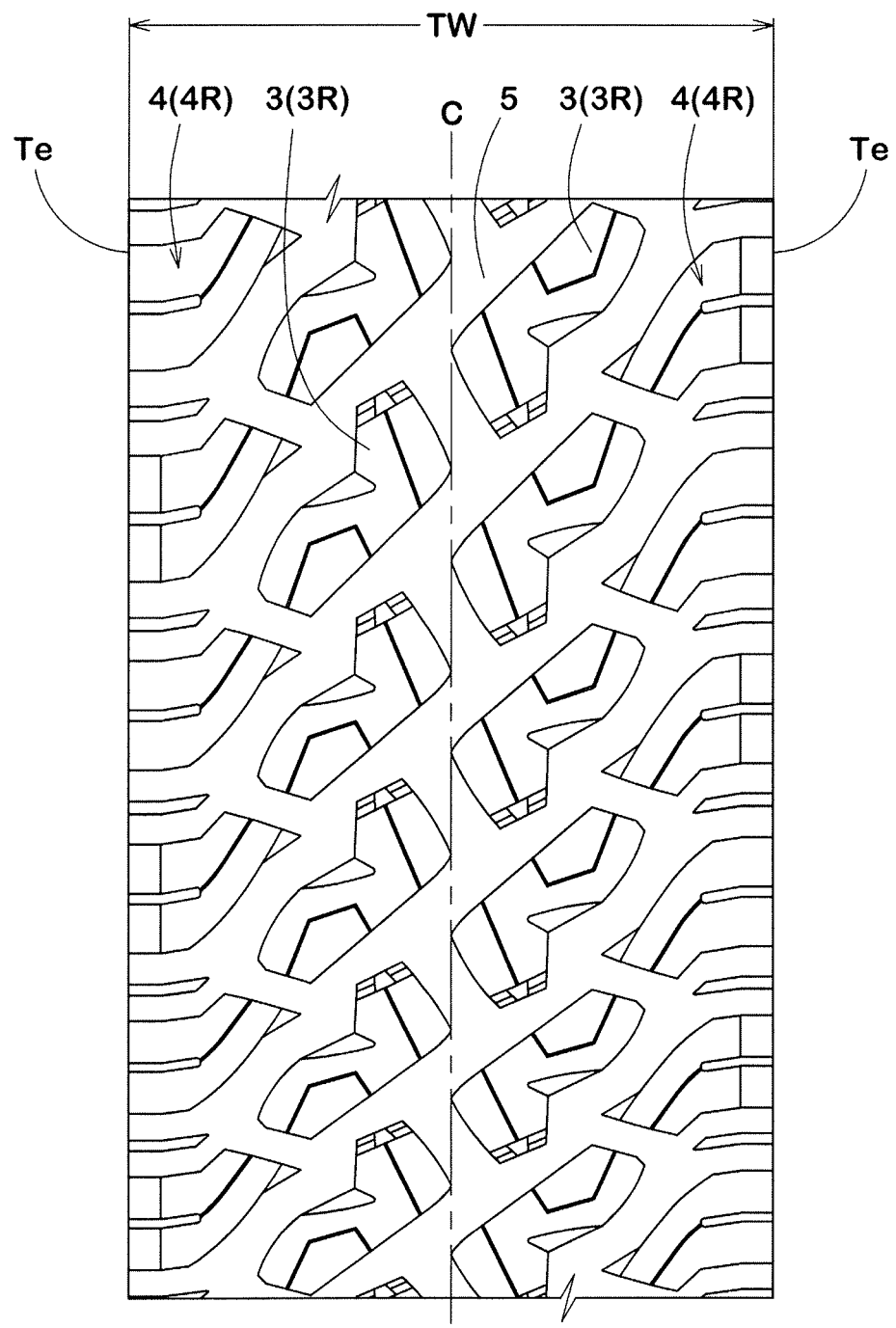
FIG. 5 is a development view of a tread portion in accordance with an aspect of the reference.

| Tread pattern | Ref. 1 FIG. 5 | Ex. 1 FIG. 1 | Ex. 2 FIG. 1 | Ex. 3 FIG. 1 | Ex. 4 FIG. 1 | Ex. 5 FIG. 1 | Ex. 6 FIG. 1 | Ex. 7 FIG. 1 | Ex. 8 FIG. 1 |
|---|---|---|---|---|---|---|---|---|---|
| Radius r1 of first circular arc portion (mm) | — | 40 | 25 | 30 | 60 | 70 | 40 | 40 | 40 |
| overlap length ratio Lb/La (%) | 70 | 70 | 70 | 70 | 70 | 70 | 45 | 50 | 92 |
| Ratio B/(A + B) (%) | 55 | 55 | 55 | 55 | 55 | 55 | 55 | 55 | 55 |
| Ratio L1/Wa (%) | 20 | 20 | 20 | 20 | 20 | 20 | 20 | 20 | 20 |
| Mud terrain performance [Score] | 100 | 110 | 105 | 109 | 108 | 106 | 105 | 108 | 108 |

| Tread pattern | Ex. 9 FIG. 1 | Ex. 10 FIG. 1 | Ex. 11 FIG. 1 | Ex. 12 FIG. 1 | Ex. 13 FIG. 1 | Ex. 14 FIG. 1 | Ex. 15 FIG. 1 | Ex. 16 FIG. 1 | Ex. 17 FIG. 1 |
|---|---|---|---|---|---|---|---|---|---|
| Radius r1 of first circular arc portion (mm) | 40 | 40 | 40 | 40 | 40 | 40 | 40 | 40 | 40 |
| Overlap length ratio Lb/La (%) | 95 | 70 | 70 | 70 | 70 | 70 | 70 | 70 | 70 |
| Ratio B/(A + B) (%) | 55 | 40 | 45 | 70 | 75 | 55 | 55 | 55 | 55 |
| Ratio L1/Wa (%) | 20 | 20 | 20 | 20 | 20 | 5 | 10 | 30 | 35 |
| Mud terrain performance (Score) | 104 | 105 | 108 | 109 | 105 | 106 | 108 | 109 | 105 |

La: Maximum circumferential central block length
A: Total of axial component length of sipe
B: Total of circumferential component length of sipe
Wa: Axial width of central block From the test results, it was confirmed that the example tires had excellent mud terrain performance as compared with the reference tire. In another test where tires having a different tire size described above were used, the same results as this test were confirmed.

What is claimed is:

1. A pneumatic tire comprising:
a tread portion having a pair of central block rows arranged on both sides of a tire equator, each of the central block rows comprising a plurality of central blocks arranged in a circumferential direction of the tire, wherein the central block rows are adjacent to each other such that no other blocks that come into contact with the ground are provided therebetween;
each of the central blocks comprising a ground contacting face having an axially inner block edge facing the tire equator;
the inner block edge comprising a first inclined edge and a second inclined edge inclined in an opposite direction to the first inclined edge so that the inner block edge protrudes toward the tire equator; and
the first inclined edge comprising a first circular arc portion having a center located on the side of the tire equator and a second circular arc portion having a center located on a side of a tread edge, wherein the first inclined edge has a length longer than that of the second inclined edge.

2. The pneumatic tire according to claim 1, wherein a radius of curvature of the first circular arc portion is in a range of from 30 to 60 mm.

3. The pneumatic tire according to claim 1, wherein the first inclined edge has a circumferential length longer than that of the second inclined edge.

4. The pneumatic tire according to claim 1, wherein the second circular arc portion is arranged on a side of the second inclined edge of the first circular arc portion.

5. The pneumatic tire according to claim 1, wherein
each of the central blocks comprises an outer block sidewall facing a tread edge,
the outer block sidewall comprises a first inclined wall and a second inclined wall inclined to cross the first inclined wall so that the outer block sidewall is dented toward the tire equator, and
the ground contacting face is provided with a recess on a portion where the first inclined wall crosses the second inclined wall.

6. The pneumatic tire according to claim 5, wherein the recess has a depth in a range of from 50% to 80% of a height of the central block.

7. The pneumatic tire according to claim 5, wherein the recess has a substantially triangle shape having one corner protruding toward the tire equator, in a plan view of the central block.

8. The pneumatic tire according to claim 5, wherein the recess has a depth gradually decreasing toward its axially inner end.

9. The pneumatic tire according to claim 5, wherein in a plan view of each central block, an angle θ between the first inclined wall and the second inclined wall is in a range of from 100 to 150 degrees.

10. The pneumatic tire according to claim 9, wherein the recess has a depth gradually decreasing toward its axially inner end.

11. The pneumatic tire according to claim 1, wherein each of the central blocks provided on one side of the tire equator is arranged with respect to each of the central blocks provided on the other side of the tire equator so as to have an overlap length in the circumferential direction of the tire in a range of from 50% to 92% a circumferential maximum length of the central block.

12. The pneumatic tire according to claim 1, wherein
each of the central block is provided with at least one sipe having a circumferential component length and an axial component length, and
the circumferential component length is in a range of not less than 45% the total of the circumferential and axial component lengths of the sipe.

13. The pneumatic tire according to claim 1, wherein a groove is provided between the pair of central block rows, and the groove extends in the circumferential direction of the tire continuously in a zigzag manner so as to traverse the tire equator.

14. The pneumatic tire according to claim 1, wherein
the inner block edge comprises a corner formed between the second inclined edge and the first inclined edge,
the first inclined edge has a first end on an opposite side to the corner, and
the first end is located outwardly in the tire axial direction with respect to the corner.

15. The pneumatic tire according to claim 14, wherein
the second inclined edge has a second end on an opposite side to the corner, and
the first end is located outwardly in the tire axial direction with respect to the second end.

16. The pneumatic tire according to claim 1, wherein
the inner block edge comprises a corner formed between the second inclined edge and the first inclined edge,
the first inclined edge has a first end on an opposite side to the corner,
the second inclined edge has a second end on an opposite side to the corner,
the first end is located outwardly in the tire axial direction with respect to the second end.

17. The pneumatic tire according to claim 1, wherein the central blocks do not axially extend across the tire equator.

18. A pneumatic tire comprising:
a tread portion having a pair of central block rows arranged on both sides of a tire equator, each of the central block rows comprising a plurality of central blocks arranged in a circumferential direction of the tire, wherein the central block rows are adjacent to each other such that no other blocks that come into contact with the ground are provided therebetween, and wherein the central blocks do not axially extend across the tire equator;
each of the central blocks comprising a ground contacting face having an axially inner block edge facing the tire equator and an outer block sidewall facing a tread edge;
the inner block edge comprising a first inclined edge and a second inclined edge inclined in an opposite direction to the first inclined edge so that the inner block edge protrudes toward the tire equator, the first inclined edge comprising a first circular arc portion having a center located on the side of the tire equator; and
the outer block sidewall comprising a first inclined wall and a second inclined wall inclined to cross the first inclined wall so that the outer block sidewall is dented toward the tire equator.

19. A pneumatic tire comprising:
a tread portion having a pair of central block rows arranged on both sides of a tire equator, each of the central block rows comprising a plurality of central blocks arranged in a circumferential direction of the tire, wherein the central block rows are adjacent to each other such that no other blocks that come into contact with the ground are provided therebetween;
each of the central blocks comprising a ground contacting face having an axially inner block edge facing the tire equator, wherein each of the central block is provided with at least one sipe having a circumferential component length and an axial component length, and the circumferential component length is in a range of not less than 45% the total of the circumferential and axial component lengths of the sipe;
the inner block edge comprising a first inclined edge and a second inclined edge inclined in an opposite direction to the first inclined edge so that the inner block edge protrudes toward the tire equator; and
the first inclined edge comprising a first circular arc portion having a center located on the side of the tire equator, wherein the first inclined edge has a length longer than that of the second inclined edge.

* * * * *